(12) United States Patent
Shelton et al.

(10) Patent No.: US 8,949,169 B2
(45) Date of Patent: *Feb. 3, 2015

(54) METHODS AND APPARATUS FOR ANALYZING SYSTEM EVENTS

(75) Inventors: Tim Shelton, Dallas, TX (US); David Harris, Dallas, TX (US); James McFadyen, Dallas, TX (US); Charles Van Niman, Southlake, TX (US)

(73) Assignee: Jerome Naifeh, Dallas, TX (US)

( * ) Notice: Subject to any disclaimer, the term of this patent is extended or adjusted under 35 U.S.C. 154(b) by 300 days.

This patent is subject to a terminal disclaimer.

(21) Appl. No.: 13/552,600

(22) Filed: Jul. 18, 2012

(65) Prior Publication Data

US 2012/0284221 A1 Nov. 8, 2012

Related U.S. Application Data

(63) Continuation-in-part of application No. 12/947,626, filed on Nov. 16, 2010, now Pat. No. 8,560,481.

(60) Provisional application No. 61/261,959, filed on Nov. 17, 2009.

(51) Int. Cl.
  *G06F 17/00* (2006.01)
  *G06N 5/02* (2006.01)
  *H04L 29/06* (2006.01)
  *H04L 12/24* (2006.01)

(52) U.S. Cl.
  CPC ........ *H04L 63/1408* (2013.01); *H04L 41/0604* (2013.01); *H04L 41/0631* (2013.01); *H04K 41/0636* (2013.01); *H04L 63/20* (2013.01)
  USPC .......................................................... 706/47

(58) Field of Classification Search
  None
  See application file for complete search history.

(56) References Cited

U.S. PATENT DOCUMENTS

| | | | |
|---|---|---|---|
| 6,647,400 B1 | 11/2003 | Moran | |
| 7,162,741 B2 | 1/2007 | Eskin et al. | |
| 7,415,391 B2 | 8/2008 | Chen et al. | |
| 8,117,308 B1 | 2/2012 | Patel | |
| 8,185,890 B2 * | 5/2012 | Harris et al. | 717/177 |
| 8,381,721 B2 * | 2/2013 | Thoe et al. | 128/203.21 |
| 8,560,481 B2 * | 10/2013 | Naifeh et al. | 706/47 |
| 8,574,063 B2 * | 11/2013 | Harris et al. | 463/25 |
| 2005/0075992 A1 | 4/2005 | Gavan et al. | |
| 2007/0169194 A1 | 7/2007 | Church et al. | |
| 2007/0245357 A1 | 10/2007 | Breiter et al. | |
| 2008/0201778 A1 | 8/2008 | Guo et al. | |
| 2008/0271143 A1 | 10/2008 | Stephens et al. | |
| 2009/0099862 A1 | 4/2009 | Fireman et al. | |
| 2010/0050262 A1 | 2/2010 | Knapp et al. | |
| 2010/0153316 A1 | 6/2010 | Duffield et al. | |
| 2011/0314148 A1 | 12/2011 | Petersen et al. | |
| 2012/0196668 A1 | 8/2012 | MacNish | |

* cited by examiner

*Primary Examiner* — Michael B Holmes
(74) *Attorney, Agent, or Firm* — The Law Office Of Patrick B. Law; Patrick B. Law (57) ABSTRACT

Apparatus and methods facilitate analysis of events associated with a plurality of computer systems. Event occurrence items are compared with event rules of event rule sets associated with each computer system to determine whether the items are potentially significant as determined by matching with the event rule sets. A scorer associated with each computer system assigns a score to each event occurrence item to provide a relative indication of the potential significance of the event occurrence item. An interface is used to query the scored event occurrence items from each of the plurality of computer systems.

19 Claims, 9 Drawing Sheets

METHODS AND APPARATUS FOR ANALYZING SYSTEM EVENTS

CLAIM OF PRIORITY UNDER 35 U.S.C. §120

The present Application for Patent is a Continuation-in-Part of pending patent application Ser. No. 12/947,626 entitled "METHOD AND APPARATUS FOR ANALYZING SYSTEM EVENTS" filed Nov. 16, 2010, which claimed benefit under 35 U.S.C. §119 of Provisional Patent Application No. 61/261,959 filed on Nov. 17, 2009, all of which are hereby expressly incorporated by reference herein.

BACKGROUND

1. Field

The present disclosure relates generally to analyzing events occurring in systems, such as computer network systems. More particularly, the present disclosure relates to apparatus and methods by which to identify event occurrences, such as intrusion attempts, that are significant, score the identified event occurrences with quantitative scores, and to efficiently store or cache the scores for multiple network systems, such as in a Managed Security Services Provider (MSSP) arrangement monitoring numerous client networks.

2. Background

Modern computer networks and systems are often times complex. Such systems typically are formed of a set of interacting or interdependent system components that together form and define the system. During system operation, many varied system events occur, both events internal to the system as well as external events that potentially affect and threaten operation of the system. A manager or operator of the system, in order fully to be aware of the system operation should be aware of system-related events, particularly events that might deleteriously affect operation of the system.

In a complex network or system, a large number of events, such as intrusion attempts, might occur daily. Logging of the occurrences of such events, when detected, permits subsequent review of the events by the system manager or operator. At the subsequent review, the system manager or operator is able to then take responsive action. Because of the potentially large number of event occurrences, the log of the event occurrences is potentially very lengthy, and review of the logged event occurrences might well be time-consuming. Furthermore, if a small number of significant event occurrences are interspersed amid a large number of insignificant event occurrences, a reviewer might not properly notice significant event-occurrence entries in the log.

While various mechanisms are available by which to provide for alerts to be generated to highlight selected event-occurrence entries, general review and analysis is still carried out in a conventional, sequential, and iterative manner. Accordingly, an improved manner by which to provide for review and analysis of system-event occurrences would be beneficial. Additionally, if an operator or system manager monitors multiple systems, the multiple log reviews, and redundancy of log entries of system-event occurrences across the multiple monitored systems, adds to the time and complexity of reviewing and analyzing system-event occurrences.

It is in light of the above problems that the presently disclosed methods and apparatus beneficially provide improved system operation and management, particularly for review and analysis of system events across multiple monitored systems or networks, such as by an MSSP.

SUMMARY

The present disclosure provides apparatus and associated methods for analyzing events occurring at a system, such as a computer network system.

According to an aspect, an apparatus for facilitating analysis of system events for a plurality of computer systems is disclosed. The apparatus includes a plurality of collected-event matchers each configured to identify collected system-event information items that match at least an event rule of an event-rule set in a respective computer system. The apparatus further includes a plurality of scorers each configured to score each system-event information item identified by a respective collected-event matcher using at least a scoring rule of a scoring-rule set, the score of each scored system-event information item used to prioritize the scored system-event information items. Further, the apparatus includes an interface configured to query in parallel scored system-event information items from each of the plurality of scorers.

According to another aspect, a method for facilitating analysis of system events for a plurality of computer systems is disclosed. The method includes identifying collected system-event information items over a plurality of computer systems that match at least an event rule of an event-rule set in a respective computer system of the plurality of computer systems. Furthermore, the method includes scoring system-event information item identified using one or more scorers each associated with a respective computer system using at least a scoring rule of a scoring-rule set, the score of each scored system-event information item used to prioritize the scored system-event information items. Additionally, the method includes querying the one or more scorers in parallel for scored system-event information items from each of the plurality of computer systems.

According to still another aspect, computer program product, comprising a computer-readable medium is disclosed. The medium includes code for causing a computer to identify collected system-event information items over a plurality of computer systems that match at least an event rule of an event-rule set in a respective computer system of the plurality of computer systems. Additionally, the medium includes code for causing a computer to score system-event information item identified using one or more scorers each associated with a respective computer system using at least a scoring rule of a scoring-rule set, the score of each scored system-event information item used to prioritize the scored system-event information items. Further, the medium includes code for causing a computer to query the one or more scorers in parallel for scored system-event information items from each of the plurality of computer systems.

DETAILED DESCRIPTION

Figure 1:
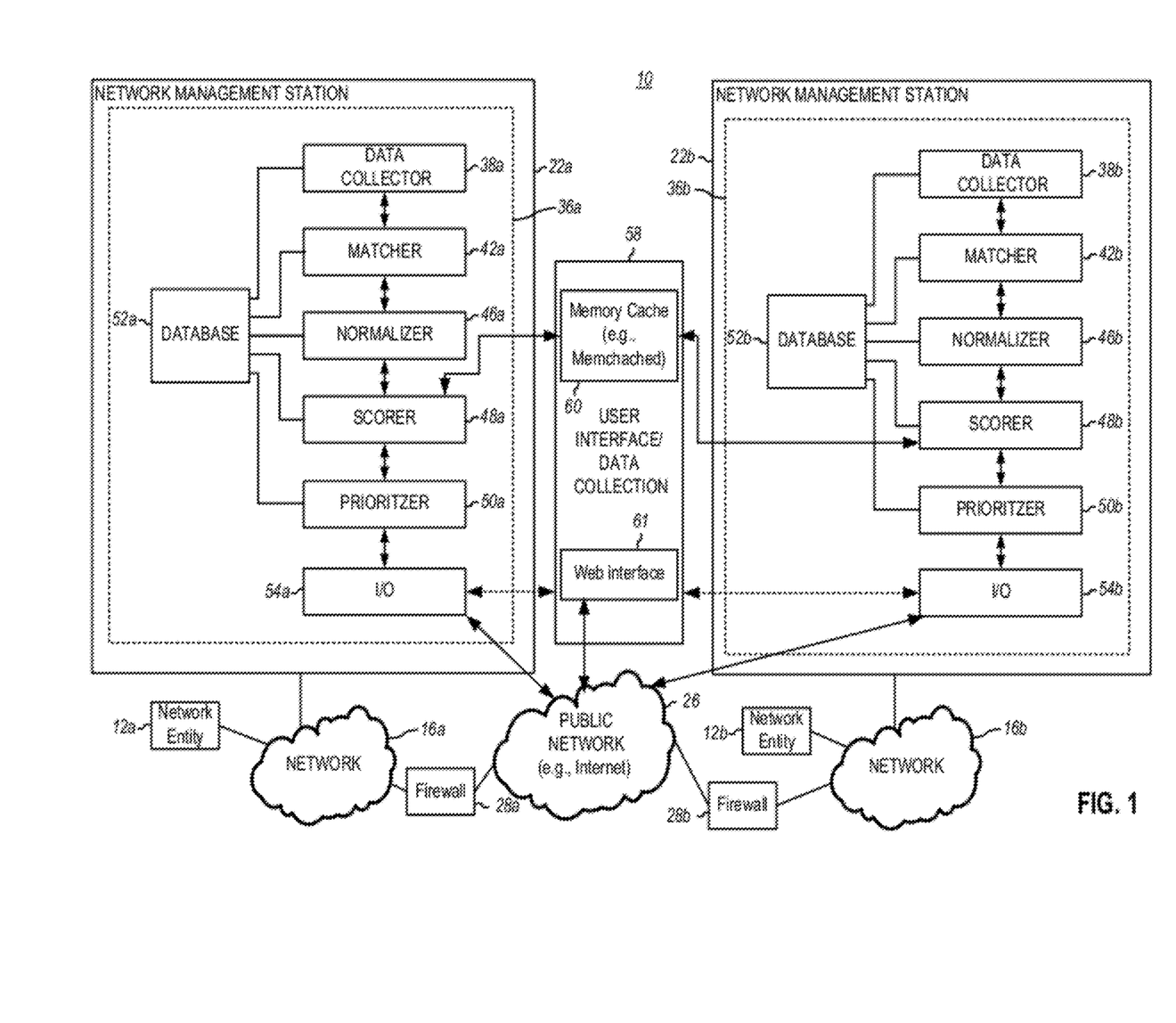
FIG. 1 illustrates a functional block diagram of an exemplary system that includes exemplary apparatus for collecting data across multiple networks.

Referring to FIG. 1, an exemplary system or systems, shown generally at 10, includes one or more entities 12a, 12b, such as work stations or servers, as merely a couple examples, that are communicatively coupled to respective networks 16a, 16b. In the example of FIG. 1, each network 16 may also be communicatively coupled to a management station 22a or 22b configured to monitor and store event-occurrences that may occur in the networks 16a, 16b. The network management stations 22 may also be in communication with the entities 12 by way of the network 16. Information messages generated by the entities 12, or responsive to inquiry generated at the network management station, are provided to the management station 22 by way of the network 16. It is noted that each network station 22 may be associated with a particular client, and all of the associated clients' stations 22 interface with a user interface/data collection unit 58, which will be discussed in more detail later. The stations 22 may be implemented by an Application Programming Interface (API), or some other type of software, hardware, or combinations thereof.

The illustrated networks 16 may be representative of a private network placeable in connectivity with a public network 26, such as the internet, and may also include there between a firewall 28a, 28b. Messages generated external to the private networks 16 and delivered to the firewalls 28 by way of the public network 26 are also routable by way of the networks 16 to the network management stations 22.

The system 10 is representative of any various networks, such as a business network, a manufacturing network, a medical network system, etc. While the following description shall describe exemplary operation with respect to an exemplary implementation in which the network system comprises a computer network system in which the network entities comprise computer servers, work stations, and the like, the network system is more generally representative of any of various network systems with the network entities being any various entities. Additionally, the exemplary configuration shown in FIG. 1 is by way of example only. In other implementations, the system 10 may be configured in other manners, and include three or more networks 16 and/or network management stations 22.

The network management stations 22 each include an exemplary apparatus 36a, 36b. The apparatus 36a, 36b facilitate analysis of operation of the network systems by collecting information related to the occurrence of events at the network system in a manner that provides a manager or operator of the network system with indications of events that are considered to be significant, thereby to permit the manager or operator more quickly to take responsive action. Apparatus 16 is functionally represented, and may be implementable in any desired manner including, for instance, by hardware elements, firmware elements, algorithms executable by processing circuitry, and combinations thereof. Additionally, while the elements of the apparatus 36a, 36b are, in the illustrated implementation, formed at a single physical entity, in other implementations, the elements may be distributed among more than one physical entity.

Each apparatus 36 includes a data collector 38, a matcher 42, a normalizer 46, a scorer 48, a prioritizer 50, a database 52, and an input/output (I/O) 54. The I/O may be configured to generate and transmit information to be used and displayed at a common user interface 58. User interface 58 is configured for monitoring multiple stations 22 and associated networks 16.

The data collectors 38 operate as event collection engines utilizing, for example, a SYSLOG or SNMP, or other analogous collection algorithm. Data collected by data collectors 38 pertain to events occurring within, or related to, the network system (e.g., the associated network 16 and various network entities 12). The collected event occurrence information, comprising raw data, is stored in the databases 52a or 52b, and thus available for subsequent retrieval. In one implementation, the data collectors 38 may comprise a component capable of loading dynamic plug-ins that support a myriad of vendors in order consistently to pulse more unique data on remote vendor systems.

The collected data stored in databases 52, or immediately collected by collector 38, are accessible by matchers 42a, 42b. Matchers 42 operate to match the collected data with predetermined conditions or "event rules", thereby forming event occurrence items. The event rules are user-defined rules or are otherwise defined. Matchers 42 match selected ones of the event rules with the event occurrence items that have been collected by the data collector. If the event occurrence item corresponds with an event rule, then the event occurrence item is considered to be a potentially significant event occurrence. Matching operations may be performed on all or selected portions of the event occurrence items collected by the data collector. Event occurrence items that match the event rules may then be normalized by normalizers 46. Normalizers 46 operate to extract, or otherwise identify the significant portions of the matched, event item occurrences. The normalizers 46 are also capable of accessing the databases 52 to be provided with the event occurrence items matched by the matcher. In addition, normalized, event occurrence items are also cached, or stored, at the database 52.

The scorers 48 also are capable of accessing the database 52. The scorers 48 operate to score (i.e., provide a quantitative value) to the normalized, matched event occurrence items. Scoring is performed by comparing the normalized, event occurrence item with score event rules. If the event occurrence item corresponds with the score event rule, then a match is made, and a score associated event occurrence item is incremented. In the exemplary implementation, each normalized, event occurrence item is scored against multiple score event rules. If a normalized event occurrence item matches multiple score event rules, then the score of the event occurrence item is of a greater value than an event occurrence item that matches fewer, or no, score event rules. The score associates a score with the event occurrence item, and the score associated with the event occurrence item is stored at the database, indexed together with the associated event occurrence item.

Prioritizers 50 access the databases 52 to obtain, or to be directly provided with, the scores associated with the event occurrence items. Prioritizers 50 prioritize the event item occurrences based upon the score assigned to the individual ones of the event occurrence items by scorers 48. The prioritizers 50 prioritize the event occurrence items, e.g., in numerical order, from highest score to lowest score, to prioritize the event occurrence items from potentially most significant, based upon the score, to least significant, based upon the score. The prioritized item entries are used, for example, to form a list of event occurrence items. Priority indications are also associated with the event occurrence items, stored at the databases 52 or immediately provided to the I/O 54. If all of the event occurrence items are considered to be an initial set, then the event occurrence items that the matchers 42 indicate to match with the event rules form a subset of the initial set. The scorers 48 score only the event occurrence items of the subset. In addition, the prioritizers 50 prioritize the items of the subset.

The I/O 56 may be configured to generate information pertaining to a prioritized listing, as well as information relating to the prioritized event occurrence items. This information is provided to or queried by the user interface 58 to permit a network system manager or operator to view the event occurrence items considered to be of greatest significance prior to lesser-prioritized event occurrence items. Additionally, through matching operations performed by the matchers 42, and subsequent normalization by the normalizers 46, the large numbers of event occurrence items are reduced so that insignificant event occurrence items are removed from further consideration. The items remain available, however, in one implementation, at the database 52 if subsequent analysis necessitates review of this additional information. It is noted that the querying of the interface 58 may be effected as a hook that pulls data from the stations 22, without necessarily a query or request per se.

In an exemplary configuration of FIG. 1, the system 10 is configured as an MSSP type arrangement where a central security provider monitors multiple systems, such as stations 22a, 22b and associated networks 16a, 16b. In this case, the system 10 includes a user interface 58 configured to effect database sharding in order to achieve better efficiency, especially when monitoring numerous client stations 22. Database sharding is a known "shared-nothing" partitioning scheme that is advantageous when using large databases (e.g., 52) across a number of servers (e.g., stations 22), that affords better database performance and scalability. This is accomplished, in part, by breaking down the collective database down into smaller chunks called "shards" that are spread across a number of distributed servers.

Further, the system 10 may include the use of a distributed memory caching algorithm, Application Protocol Interface (API), or system such as open source software "Memcached" by Danga Interactive, for example. The memory caching, as illustrated by cache 60 in interface 58, may be used for storing data, such as the correlation data (e.g. scored events), in memory with a temporal aspect (i.e., a timeout for storing data, after which the data is purged or overwritten). In a particular aspect, the use of Memcached's API, as one example, provides a large hash table distributed across multiple machines (e.g., stations 22). When the hash table is full, subsequent inserts cause older data to be purged in a least recently used (LRU) order. By using such distributed memory caching, the system 10 may be sped up, which is particular advantageous in threat detection and security systems. It is noted that although the cache 60 is illustrated within interface 58, this is merely exemplary, and the cache 60 may be located in a separate device communicatively couple with stations 22 and interface 58.

Still further with respect to FIG. 1, it is noted that each client's station 22 may interface with the interface 58 via a network such as the internet or world wide web (e.g. 26), or alternatively may communicate directly as indicated by the dashed arrows from stations 22 to interface 58. In the case of a web interface or web portal interface, code or an API indicated by block 61 may effect web interface with client stations 22 or with another client device (not shown). Additionally, features of the web interface may include the functionality of allow clients to create user privileges allowing change to configurations such as ruleset (to be discussed further in later portions of this application), as well as user rights assignments for allowing access. Furthermore, the interface 58, 61 affords the ability for a client with multitenants to create their own rulesets, as well as accommodate different systems such as Unix or Windows systems. It is also noted that interface 58 may be virtually effected or hosted in a cloud computing environment across multiple and varied servers.

Figure 7:
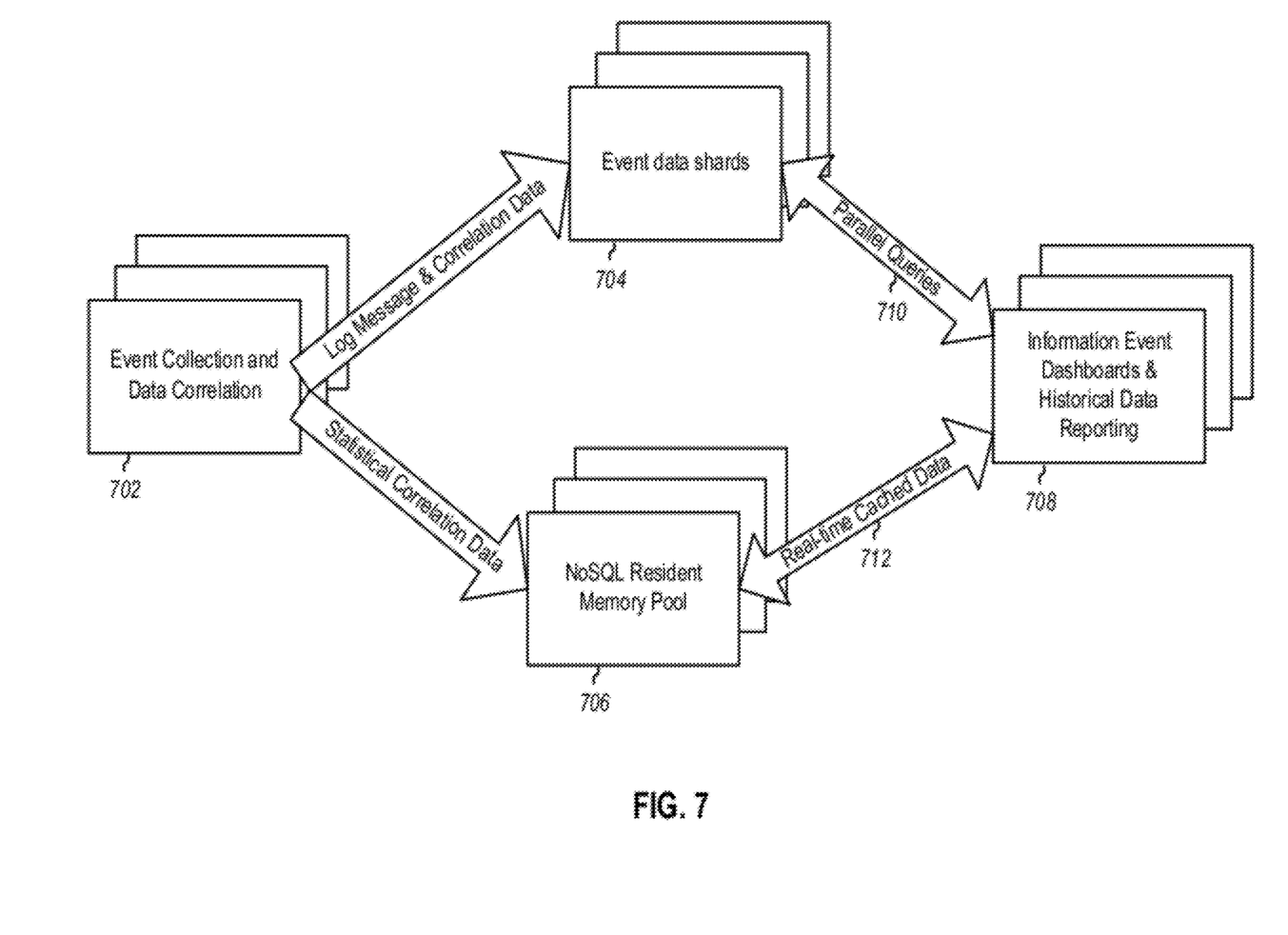
FIG. 7 illustrates an exemplary process flow in the system of FIG. 1 in relation to use of database sharding and distributed memory caching.

FIG. 7 illustrates an exemplary process flow in the system 10 in relation to use of database sharding and distributed memory caching. As illustrated, event collection and data correlation is performed at blocks 702 by multiple devices, such as stations 22. In a particular example, the event collection may be performed by data collectors 38, and correlation performed by matchers 42, normalizers 46, and scorers 48. Log Messages and correlation data are sharded across databases 52, at database storage within interface 58 (not shown), or both as event data shards as illustrated by block 704. Statistical correlation data, such as data generated by scorers 48 is cached in a distributed memory cache or NoSQL Resident Memory Pool, such as cache 60, as shown by blocks 706.

Block 708 illustrates that information event dashboards, or other display methods, and historical data reporting may be effected by parallel queries 710 to the event data shards stored across multiple databases (e.g., 52) in system 10. Furthermore, real-time cached data from the NoSQL Resident memory pool (e.g., cache 60), may be accessed as shown by arrow 712. This affords current event occurrence information of threats or other types of activity in real-time without the need for large SQL database storage.

Figure 2:
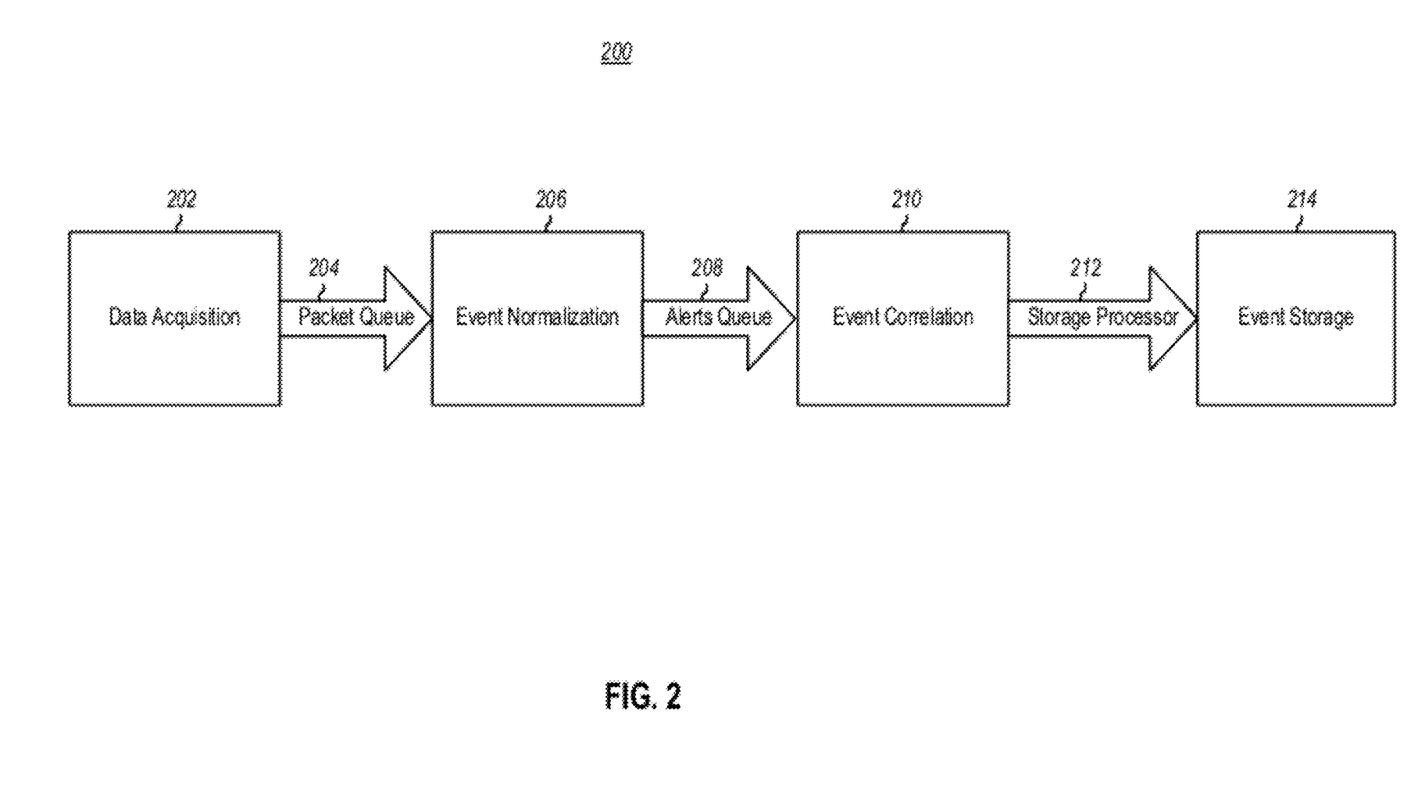
FIG. 2 illustrates a process diagram representative of the process of acquiring, normalizing, correlating or matching, and storing of event data during operation of the presently disclosed apparatus and methods.

Turning next to FIG. 2, a process 200 is shown, representative of operation of at least a portion of each apparatus 36 shown in FIG. 1. As indicated by block 202, even data is acquired or generated, either by network-system-entity origination, external origination, or responsive to network-system request. The data are related to the occurrence of events that pertain to the network system, i.e., comprise event occurrences. In an aspect, the event occurrences may be collected as event occurrence items by the data collectors 38a or 38b shown in FIG. 1.

As indicated by arrow 204, the acquired data is then queued for input to event normalization 206. After normalization, an alerts queue 208 is generated for processing by event correlation 210. Here the event data may be correlated or matched through use of a rule set that utilizes a decision tree algorithm and/or fuzzy logic effected by matchers 42, and scorers 48, as an example. Event occurrence items that match the rules with which the items are then output for further processing as indicated by arrow 212 and storage as indicated by event storage 214 (e.g., databases 52).

Figure 3:
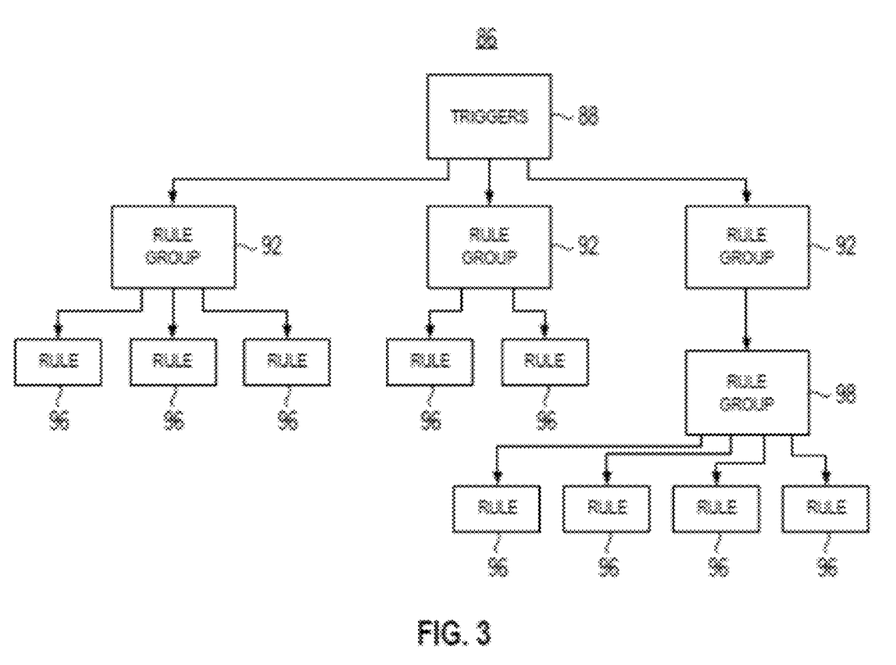
FIG. 3 illustrates an exemplary representation of a nested, management tree used pursuant to matching operations.

FIG. 3 illustrates an exemplary decision tree 86, utilized to match event occurrence items with event rules. The decision tree defines multiple layers and is configured to provide for quick matching of an event item to its related signature. A first layer is referred to as a trigger. The exemplary decision tree 86 includes a single trigger 88. Other decision trees have additional triggers. Determination is made as to whether the trigger matches the event occurrence item. If the event occurrence item matches the trigger, then rule groups, here rule groups 92 are accessed and the event rules 96 are compared with the event occurrence items to determine whether the event occurrence items match with the respective event rules. Nesting within the decision tree is possible, indicated by the sub-rule group 98 of one of the rule groups 92.

Additionally, a module is a container of similar triggers, rule groups, and rules. A module can also contain information regarding the module, including its name, description, devices that the module supports, versioning information, and any other appropriate further documentation related to the module. The nesting of the rule groups facilitates grouping similar rules together. In order for rules to be processed within a rule group, the rule group must match the event occurrence item that is compared against the rule group. In addition, when a rule group is nested, a match of both the rule group and the sub-rule group is required.

In operation, when an indication of an event occurrence is received, the received indication is processed by a receiving engine, represented in FIG. 1 by the data collector 38. Examples of receiving engines include the aforementioned SMNP, SYSLOG, and other algorithms. A role of the receiving engine is to convert the received information into a normalized event. The normalized event is represented, e.g., by a hash table, comprising related information of the indication of the event occurrence, including, e.g., network address information, a received time stamp, and the payload of the message of the received indication. The normalized event is provided to an event matching module, represented by matchers 42 in FIG. 1.

The event matching module is responsible for taking the initial, normalized event and matching the indication of the event against the pre-defined rule set. The is carried out through recursive functionality, providing a tree-like structure, such as the decision tree 86, for data management. The rule set modules include, e.g., compiled modules and a textual rule set. Binary, compiled modules are not defined by behavior and are able to accomplish matching by any available manner or by taking advantage of textual rule sets.

Textual rule sets are separated into three basic classifications that provide for matching. The first class-type is defined as a trigger. A trigger, such as the trigger 88, is a regular expression that must match in order for the rules within the module to continue processing. Additionally, a list of triggers can be specified. Upon matching of a first successful trigger, processing of the associated module continues. A subsequent separating stage comprises the multi-decision tree structure in which any desired number of peer or child nodes for any specified node within the tree structure can be created. Each requires a successful matching before matching against a child node thereof within the decision tree. Rule grouping allows like rules to be grouped together in as many levels as desired, thereby to improve the speed of matching against a lengthy rule list.

A rule contains all of the information required for improved matching, correlation, and scoring. Each rule contains the alert name, a category, a knowledge base identification, host and network packet information, as well as audit procedure information for compliance, monitoring, and scoring. A final rule, upon a successful match, permits assignment of the specific information to a normalized has table to the event occurrence item. In addition, a final rule allows for multiple matching rules as well as a logical no indication. Once all activities are complete, the event is passed into a processing queue for archiving, scoring, and performing additional correlation.

Figure 4:
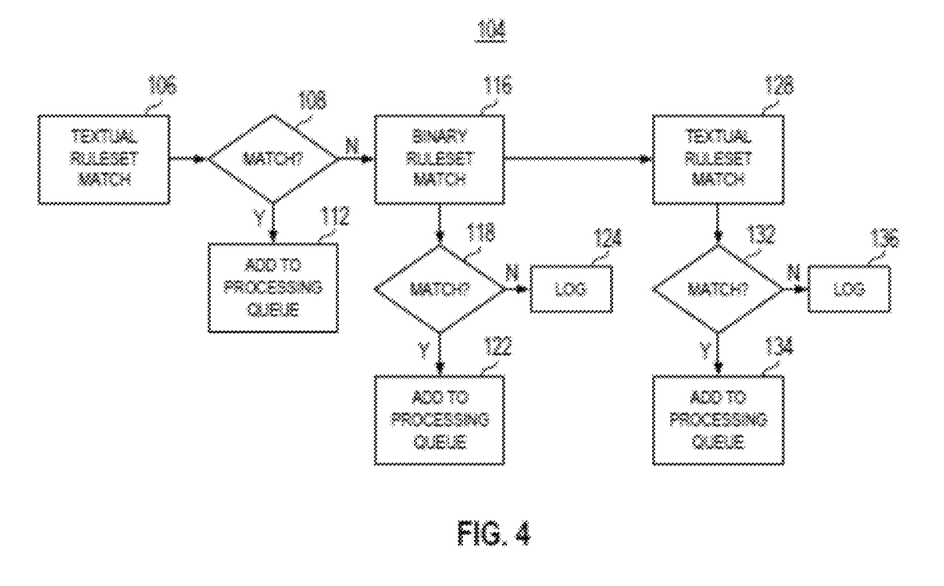
FIG. 4 illustrates another process diagram, also representative of the process of matching performed during operation of an embodiment of the present invention.

FIG. 4 illustrates a process diagram 104. The process 104 is representative of logical decisions made through use of the decision-tree architecture shown in FIG. 3. First and as indicated by the block 106, a textual rule set match is created. Then, a determination is made at the decision block 108 as to whether a match has been made. If yes, the associated event occurrence item is added to a processing queue, indicated by the block 112. If, conversely, a match is not made, the no branch is taken to the block 116, and a binary rule set matching operation is carried out. A determination is made, indicated at the decision block 118, as to whether the event occurrence item matches the rule of the rule set. If so, the event occurrence item is added to the processing queue, indicated at the block 122. If, conversely, a match is not made, the no branch is taken from the decision block 118 to the log block 124.

The process 104 further includes the additional optional operations, indicated at the block 128 of performing a textual rule set match. A determination is made, indicated by the decision block 132, as to whether a match is made. If so, the yes branch is taken to the block 134, and the even occurrence is added to the processing queue. Otherwise the no branch is taken to the log block 136, and the lack of match is logged.

Figure 5:
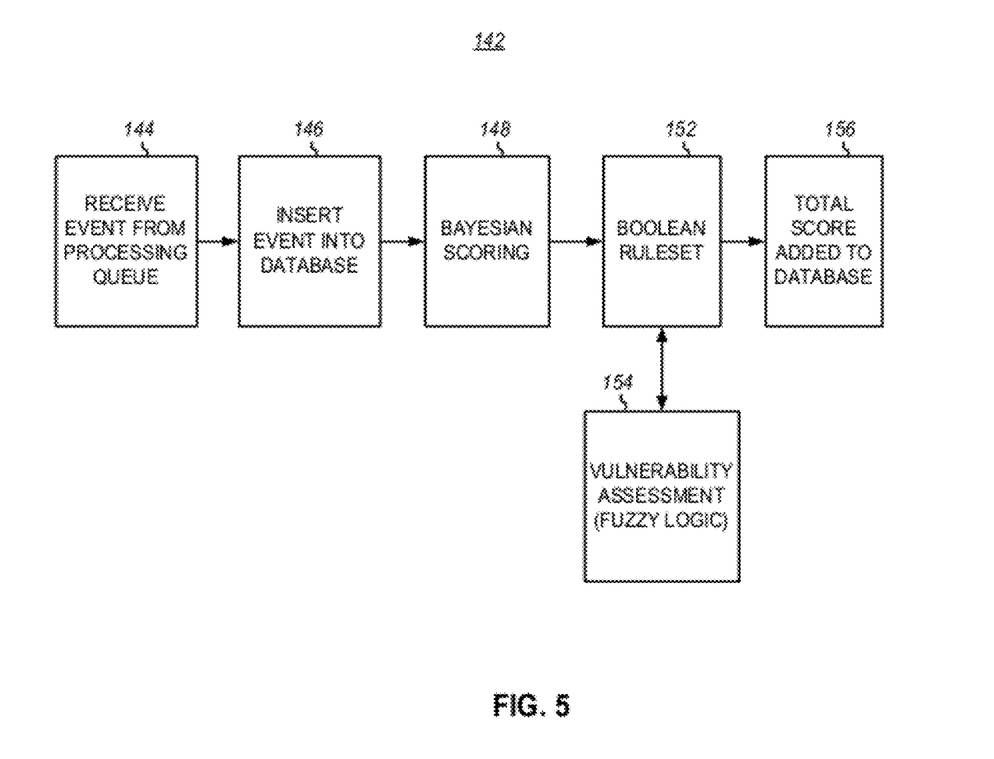
FIG. 5 illustrates a diagram representative of the process of storing performed during operation of an embodiment of the present invention.

FIG. 5 illustrates a process 142 representative of further exemplary operation of an embodiment of the present invention. The process 142 is representative of scoring of event occurrence items that have been matched by a matching operation with an event rule of an event rule set.

First, and as indicated by the block 144, the event is received from a processing queue. Then, and as indicated by the block 146, the event occurrence item is inserted into a database. In addition, as indicated by the block 148, Bayesian scoring is performed. Then, and as indicated by the block 152, Boolean rules of a score rule set are compared with the event occurrence item.

Additionally, the present process 142 further includes a vulnerability assessment in conjunction with the Boolean comparison in block 152 as indicated in block 154. The vulnerability management may utilize fuzzy logic or an equivalent thereof to compare how closely two strings match. For example, if two compared strings are 70 percent in the closeness, the management block 154 may return a score of "X". If the compared strings even more closely match, such as 90 percent match, the vulnerability management block 154 may assign another higher score of "Y", whereas if the match is not close (e.g., 10%), then the block might return a zero score as part of the vulnerability management. This vulnerability management affords current assessment of vulnerabilities rather than rely upon potentially much delayed assessment based on Common Vulnerability Exposure (CVE) data.

Finally, as indicated by the block 156, a summed score, i.e., a cumulated or cumulative score, of matches of score rules of a score rule set and the event occurrence item is obtained.

An event occurrence item is received, matched, normalized, and correlated based upon relative information. Then, a score is assigned to the event occurrence item. The score value is determined from a variable length, rule set that determines a successful or unsuccessful match against the unique rules of the rule set. Each rule of the score rule set can have multiple arguments and, in the exemplary implementation, implemented as a Boolean rule, as a positive or negative value. The score, responsive to a successful match of a specific score rule, is summed together with other score-rule results in order to arrive at a final, overall score. The overall score is responsible for relating importance, acting upon thresholds, etc.

An event is any event that might be of interest, such as a user action, a log entry, a security notification, or a performance statistic. A message identifying an event occurrence is originated at any of various devices, including, e.g., an information security device, a network appliance, a computer server, and a computer work station. In addition, once an event occurrence item is read from a processing and scoring queue, the information related thereto is written to a database, scored against a multitude of scoring mechanisms, and the total score is updated against the newly processed event.

In the exemplary implementation, before an event is compared against rules of a score rule set, a Naïve Bayesian score is determined. The score is determined by first taking the necessary data chunks out of each required string. The strings are extracted from any of various places including, e.g., the alert name, category type, and payload part of the event occurrence item message.

The Bayesian score is included with existing event properties that are processed by the score rule sets. A rule set is any list of rules that is associated with a positive, or negative, score. When a rule set matches against a provided event, the associated score is added to the existing score. The initial score is zero. Once all of the rules have been compared against an event, a total score is determined and associated within a database to the initial event information, permitting future actions to be taken, based upon a score threshold.

The following are exemplary actions that define score rules that are matched against an event occurrence item. An alert name (regular expressions), an alert category (regular expressions), audit actions, Bayesian score, count (by host/alert), a count (by host/category), a host, either destination or source, an event payload, a port, either destination or source, an alert priority, a resource, and a time stamp are exemplary rules of a score rule set that are utilized in various implementations, define matches that are scored.

When a Bayesian score is utilized, a Bayesian histogram analysis algorithm is utilized to uniquely fingerprint known security and performance issues, while establishing a base line for positive or neutrally-acceptable network traffic, utilizing standard deviation. The algorithm identifies unique attributes within a specified target event. The activity in conjunction with standard deviation facilitates pattern matching. Thereby, both known or trained information is matched and, through use of standard deviation, target events that have not been trained or identified are also matched. An operating baseline is thereby established.

Figure 8:
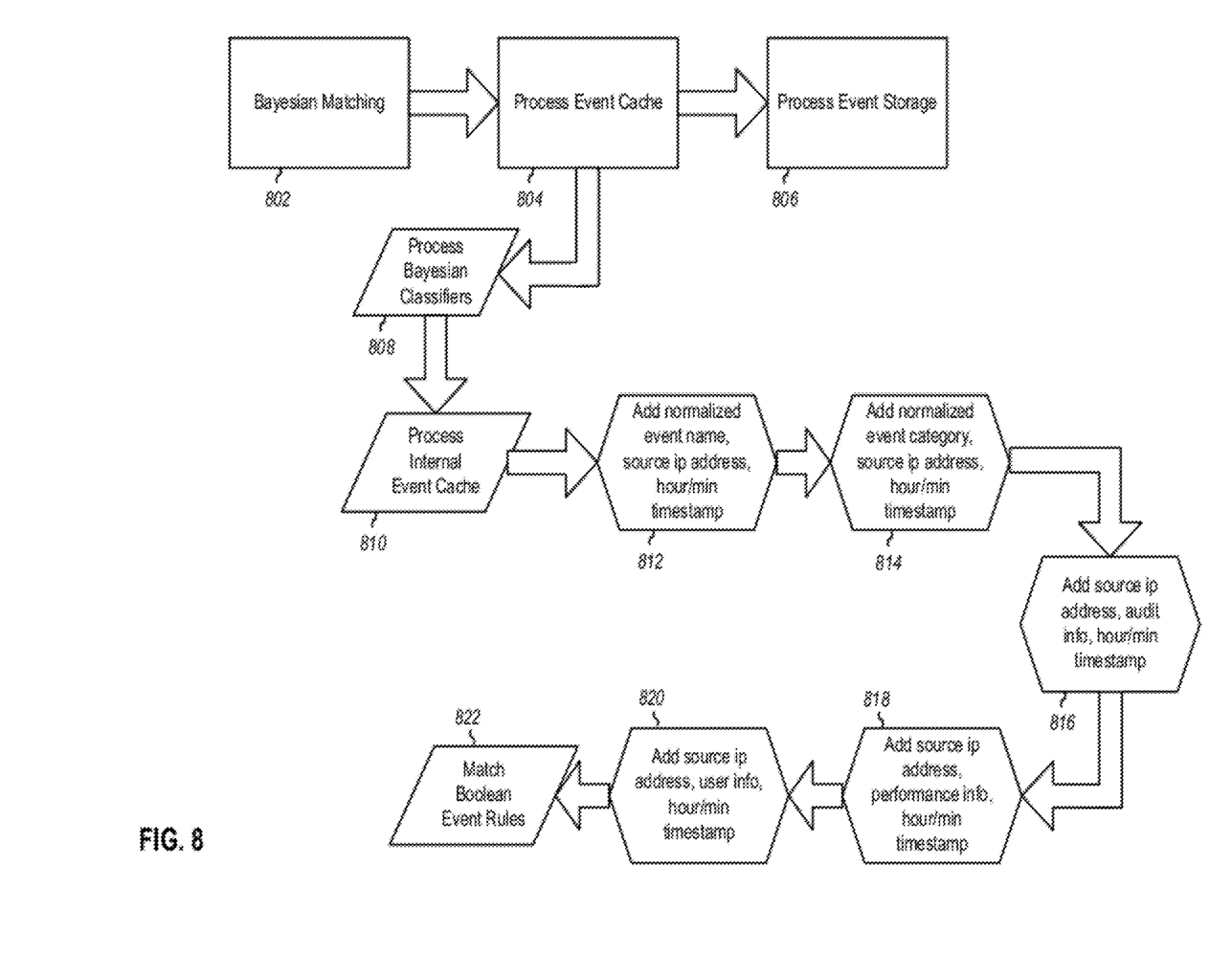
FIG. 8 illustrates an exemplary process flow for event correlation according to the present disclosure.

FIG. 8 illustrates an exemplary flow diagram 800 of an exemplary process for event correlation after the Bayesian matching in block 210 of FIG. 2. In particular, process 800 is a means of populating data in the Memcached cache. As shown, after Bayesian matching 802 flow proceeds to a process event caching or storage process in block 804. Event storage may be processes as indicated in block 806. Additionally, Bayesian classifiers may be processed as indicated by operation 808. Here attributes are learned, whether good or bad.

After block 808, an internal event cache processing is effected as shown in block 910. Processes as part of this processing are illustrated by block 812, 814, 816, 818, and 820 where different key-value data are entered with the key indicating the type of data and value being the actual data. The types of data inserted in blocks 812 through 820 is not meant to be exhaustive, and is merely exemplary. Examples of various contemplated keys and their corresponding descriptions that may be cached are indicated in Table 1 below.

TABLE 1

| Correlation Key | Correlation Key Description |
| --- | --- |
| alert | Alert Name |
| alert_category | Alert Category |
| resource | Resource/Asset Name |
| payload/message | Payload |
| ip_src | Source IPv4/IPv6 |
| ip_dst | Destination IPv4/IPv6 |
| tcp_sport | TCP Source Port |
| tcp_dport | TCP Destination Port |
| udp_sport | UDP Source Port |
| udp_dport | UDP Destination Port |
| bayes_weight | Bayesian Weight |
| stddev_weight | Standard Deviation Weight |
| priority | Priority |
| timestamp | Event Timestamp |
| vuln | Vulnerability Threshold |
| correlation_username | Username |
| audit_login | Audit Action Login |
| audit_logoff | Audit Action Logoff |
| audit_policy_change | Audit Action Policy Change |
| audit_log_change | Audit Action Log Change |
| audit_object_access | Audit Action Object Access |
| audit_user_action | Audit Action User Action |
| audit_system_event | Audit Action System Event |
| audit_session_status | Audit Action Session Status |
| audit_account_validation | Audit Action Account Validation |
| audit_user_change | Audit Action User Change |
| audit_group_change | Audit Action Group Change |
| system.cpu.load | Performance CPU Load |
| system.cpu.util | Performance CPU Utilization |
| system.memory.size[free] | Performance Physical Memory Free |
| system.memory.size[total] | Performance Physical Memory Total |
| vm.memory.size[total] | Performance Virtual Memory Total |
| vm.memory.size[cached] | Performance Virtual Memory Cached |
| vm.memory.size[buffers] | Performance Virtual Memory Buffers |
| vm.memory.size[shared] | Performance Virtual Memory Shared |
| vm.memory.size[free] | Performance Virtual Memory Free |
| net.if.in[DEVICE_NAME,packets] | Network Interface Input Packets |
| net.if.in[DEVICE_NAME,bytes] | Network Interface Input Bytes |
| net.if.in[DEVICE_NAME,dropped] | Network Interface Input Dropped |
| net.if.in[DEVICE_NAME,errors] | Network Interface Input Errors |
| net.if.out[DEVICE_NAME,packets] | Network Interface Output Packets |
| net.if.out[DEVICE_NAME,bytes] | Network Interface Output Bytes |
| net.if.out[DEVICE_NAME,dropped] | Network Interface Output Dropped |
| net.if.out[DEVICE_NAME,errors] | Network Interface Output Errors |
| vfs.dev.read[DISK_NAME,sectors] | Virtual Drive Read Sectors |
| vfs.dev.read[DISK_NAME,operations] | Virtual Drive Read Operations |
| vfs.dev.write[DISK_NAME,sectors] | Virtual Drive Write Sectors |
| vfs.dev.write[DISK_NAME,operations] | Virtual Drive Write Operations |
| vfs.fs.size[DISK_NAME,total] | Virtual Drive Size Total |
| vfs.fs.size[DISK_NAME,free] | Virtual Drive Size Free |

After population of data in the cache, matching of Boolean Event Rules is effected based on the stored data as indicated in block 822.

Figure 9:
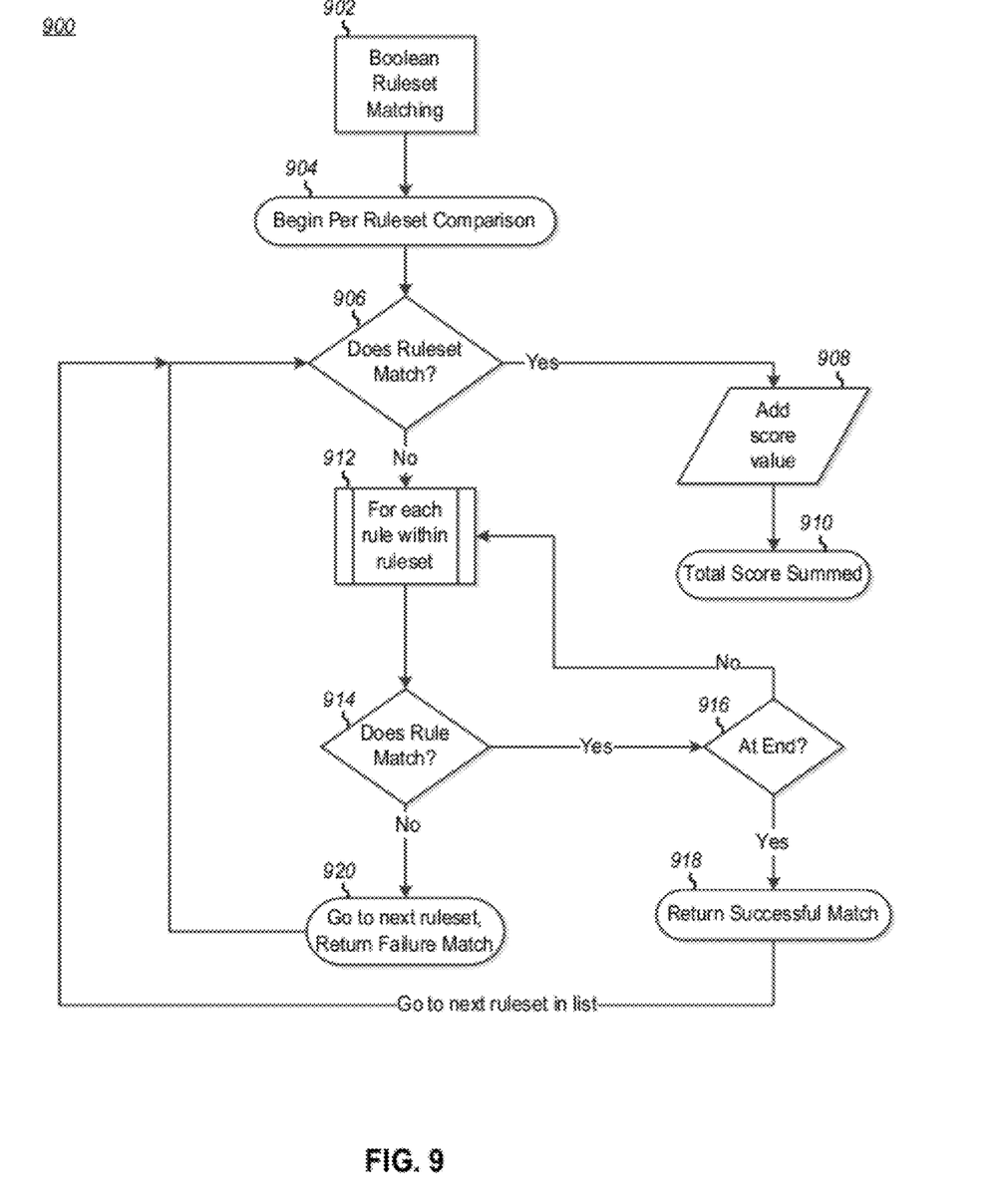
FIG. 9 illustrates a process for scoring ruleset matching for use in the presently disclosed apparatus and methods.

FIG. 9 illustrates a process 900 for scoring ruleset matching for use in the presently disclosed apparatus and methods.

As illustrated, process 900 begins with initiation of Boolean ruleset matching as indicated by block 902. The process 900, in particular, begins a per ruleset comparison as indicated by block 904. A comparison is then performed in decision block 906 to determine an event matches with a ruleset. If so, flow proceeds to block 908 where a score value is added and then the total score summed as indicated in block 910.

Alternatively at block 906, if the ruleset does not match, flow proceeds to block 912 where a comparison of whether each rule within a ruleset matches as indicated in block 914. If an event rule matches, flow proceeds to block 916 to determine if the end of the rules within the ruleset has occurred (i.e., all rules in the ruleset have been examined). If not, flow proceeds back to block 912. On the other hand, if the end of the rules has occurred as determined in block 916, flow proceeds to block 918 to indicate a successful match has been returned, and flow proceeds back to block 906 to compare to a next ruleset.

If the rule does not match, as determined in decision block 914, flow proceeds to block 920, wherein a failure match is returned and flow then proceeds to the next ruleset.

Figure 6:
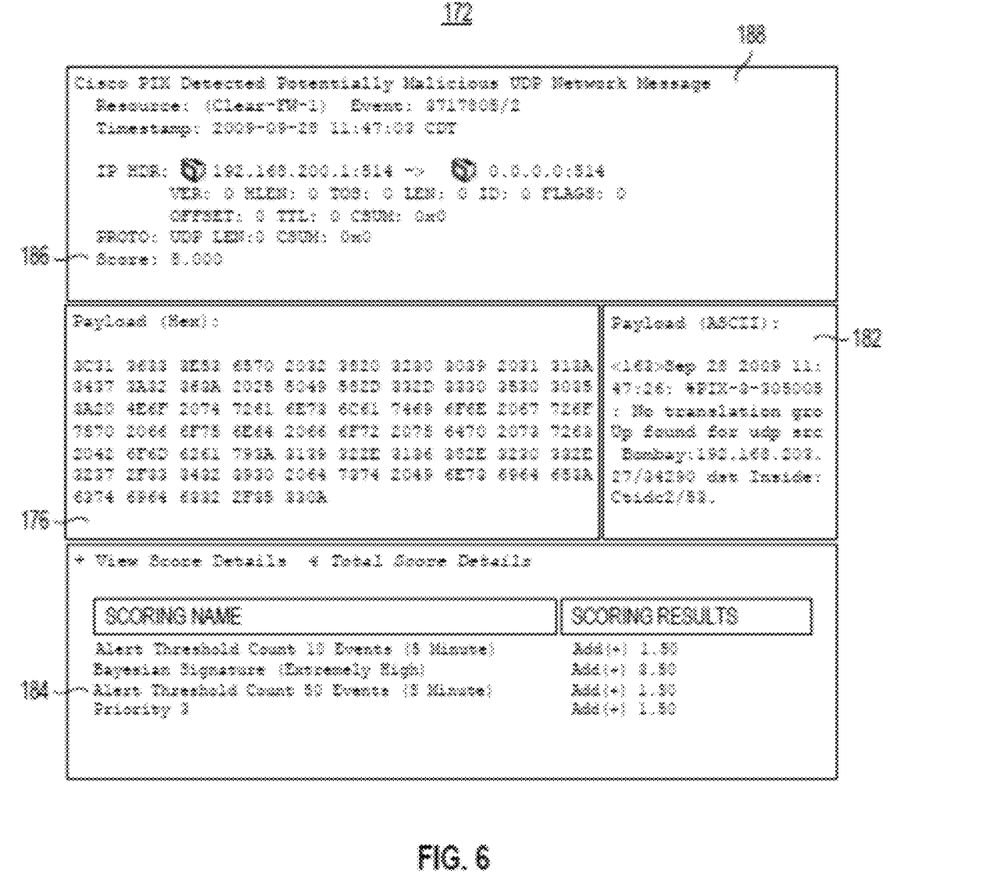
FIG. 6 illustrates an exemplary display generated of an exemplary event including a score associated therewith, generated pursuant to operation of an embodiment of the present invention.

FIG. 6 illustrates an exemplary screen display 172 generated during operation of an embodiment of the present invention. The screen display is related to a single event occurrence item. Here, the raw data comprising the message forming the event occurrence item is displayed in hexadecimal form at the portion 176 and in ASCII form at the portion 182. Scoring results are indicated at the portion 184, a total score is indicated at 186, and other descriptive information is displayed in the portion 188. The display 172 is displayed at a display screen of the user interface, which provides a role-based access control for administration over secure encrypted sessions.

In light of the foregoing, apparatus and methods are provided by which to facilitate analysis of events that are related to a network system across multiple network or computer systems. Event occurrence items that are considered to be potentially significant are scored, and the score is used to prioritize the sequence order of potentially significant event occurrence items that are analyzed by a network system manager or operator. These may then be queried by a central or main interface, such as 58, to further process the event information items.

Those of skill will further appreciate that the various illustrative logical blocks, modules, circuits, and algorithm steps described in connection with the embodiments disclosed herein may be implemented as computer software, as well as hardware or logic, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module or API executed by a processor, or combinations thereof. A software module may reside in RAM memory, flash memory, ROM memory, EPROM memory, EEPROM memory, registers, hard disk, a removable disk, a CD-ROM, or any other form of storage medium or computer program product known in the art. An exemplary storage medium or computer program product may be coupled to the processor such the processor can read information from, and write information to, the storage medium. The storage medium, computer-readable medium, or computer program product is fixed and non-transitory, and is configured to include or store code or programming instructions that, when executed by a processor or computer, effect the methods or algorithms disclosed herein.

The word "exemplary" is used herein to mean "serving as an example, instance, or illustration." Any embodiment described herein as "exemplary" is not necessarily to be construed as preferred or advantageous over other embodiments. Additionally, the previous descriptions are of preferred examples for implementing the presently disclosed methods and apparatus, and the scope thereof should not necessarily be limited by this description. The scope of the present invention is defined by the following claims.

What is claimed is:

1. An apparatus for facilitating analysis of system events for a plurality of computer systems, the apparatus comprising:
    a plurality of collected-event matchers each configured to identify collected system-event information items that match at least an event rule of an event-rule set in a respective computer system;
    a plurality of scorers each configured to score each system-event information item identified by a respective collected-event matcher using at least a scoring rule of a scoring-rule set, the score of each scored system-event information item used to prioritize the scored system-event information items; and
    an interface configured to query in parallel scored system-event information items from each of the plurality of scorers.

2. The apparatus of claim 1 further comprising a distributed memory cache associated with the interface and configured to store real-time event data from one or more of the plurality of scorers.

3. The apparatus of claim 2 further comprising the cache configured to temporarily store real-time event data and configured to be accessible by the plurality of scorers for use in determining the scored system-event information.

4. The apparatus of claim 2 wherein the distributed memory cache is a Memchached cache.

5. The apparatus of claim 1 wherein the at least one scoring rule of the scoring-rule set comprises a Bayesian score generated based on pattern matching.

6. The apparatus of claim 1, wherein the interface comprises a web based interface in communication with each of the plurality of collected-event matchers and the plurality of scorers.

7. The apparatus of claim 6, wherein the web interface is configured to allow one or more clients respectively associated with corresponding ones of the plurality of collected-event matchers and the plurality of scorers to define at least one corresponding ruleset by which at least a corresponding matcher or scorer is operable for scoring system events.

8. The apparatus of claim 6, wherein the web interface is further configured to allow one or more clients respectively associated with corresponding ones of the plurality of collected-event matchers and the plurality of scorers to create at least one of associated user privileges and user rights assignments.

9. The apparatus of claim 1 further comprising:
    a set of one or more Boolean rulesets; and
    a fuzzy logic unit associated with the Boolean rulesets and configured to assess vulnerability of real time event data.

10. A method for facilitating analysis of system events for a plurality of computer systems, the method comprising:

identifying collected system-event information items over a plurality of computer systems that match at least an event rule of an event-rule set in a respective computer system of the plurality of computer systems;

scoring system-event information item identified using one or more scorers each associated with a respective computer system using at least a scoring rule of a scoring-rule set, the score of each scored system-event information item used to prioritize the scored system-event information items; and querying the one or more scorers in parallel for scored system-event information items from each of the plurality of computer systems.

11. The method of claim 10 further comprising:

storing real-time event data from the one or more scorers using a distributed memory cache associated with an interface querying the one or more scorers and configured to store.

12. The method of claim 11 wherein the distributed memory cache is configured to temporarily store real-time event data and configured to be accessible by the plurality of scorers for use in determining the scored system-event information.

13. The method of claim 11 wherein the distributed memory cache is a Memchached cache.

14. The method of claim 10 wherein the at least one scoring rule of the scoring-rule set comprises a Bayesian score generated based on pattern matching.

15. The method of claim 10, wherein the querying is performed at least by an interface comprising a web based interface at least in communication with each of one or more scorers.

16. The method of claim 15, wherein the web interface is configured to allow one or more clients respectively associated with corresponding ones of the plurality of collected-event matchers and the plurality of scorers to define at least one corresponding ruleset by which at least a corresponding matcher or scorer is operable for scoring system events.

17. The method of claim 16, wherein the web interface is further configured to allow one or more clients respectively associated with corresponding ones of the plurality of collected-event matchers and the plurality of scorers to create at least one of associated user privileges and user rights assignments.

18. The method of claim 10 further comprising:

utilizing a set of one or more Boolean rulesets, and a fuzzy logic unit associated with the Boolean rulesets and configured to assess vulnerability of real time event data.

19. A computer program product, comprising:

a non-transitory computer-readable medium comprising:

code for causing a computer to identify collected system-event information items over a plurality of computer systems that match at least an event rule of an event-rule set in a respective computer system of the plurality of computer systems;

code for causing a computer to score system-event information item identified using one or more scorers each associated with a respective computer system using at least a scoring rule of a scoring-rule set, the score of each scored system-event information item used to prioritize the scored system-event information items; and code for causing a computer to query the one or more scorers in parallel for scored system-event information items from each of the plurality of computer systems.

* * * * *